Figure 1:
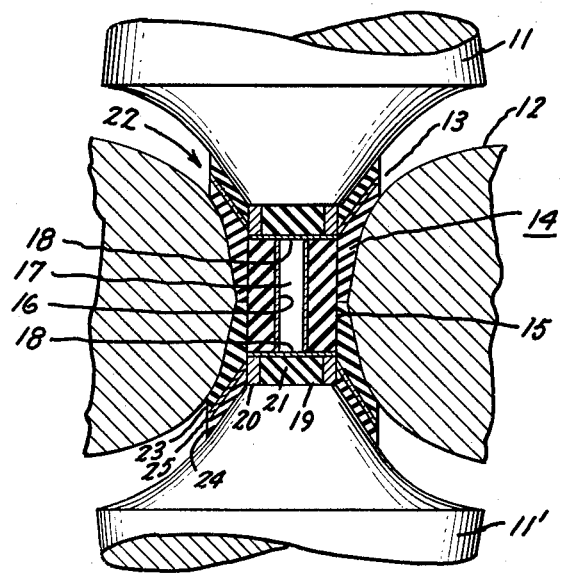

July 21, 1964

A. J. DE LAI 3,141,746

DIAMOND COMPACT ABRASIVE

Filed Oct. 3, 1960

Inventor:
Anthony J. De Lai;
by James J. Lichiello
His Attorney.

United States Patent Office

3,141,746
Patented July 21, 1964

3,141,746
DIAMOND COMPACT ABRASIVE
Anthony J. De Lai, Cincinnati, Ohio, assignor to General Electric Company, a corporation of New York
Filed Oct. 3, 1960, Ser. No. 60,045
4 Claims. (Cl. 51—307)

This invention relates to bonding of diamond crystals and more particularly to bonding of a plurality of diamond crystals together to provide an improved coherent tough compact or conglomerate form to be utilized in various diamond tools.

The joining, bonding or otherwise attaching of a diamond crystal to a support member represents a very difficult bonding problem, and it appears that generally only a mechanical joint is achieved between the diamond crystal and the support. In those circumstances where large tools are desired, it may be necessary to provide proportionately larger single crystal diamonds. However, larger industrial diamonds for cutting and grinding purposes represent a large economic investment which is disadvantageous. In grinding and cutting tools, wheel dressers, and the like, attempts have been made to overcome the bonding and economic problems by the use of a plurality of individual diamond crystals suitably bonded in or otherwise dispersed within a metallic matrix which is mounted in a suitable holder or support. In the use of this type of tool, the matrix continually wears away to, in turn, continually expose new diamond crystals and the tool is rendered useless or inoperative after a sufficient amount of the matrix wears away, the matrix being a limiting feature of the tool. However, in addition to the advantages of better bonding and low cost, the wearing away of the matrix provides a continuing supply of clean sharp crystals, and loss of crystal does not deleteriously affect tool operation.

A process has long been sought whereby diamond powder, or a plurality of small diamond crystals may be suitably bonded to each other to form a tough compact or conglomerate to be used as a diamond tool. However, as described above, where the problem of bonding a diamond to a suitable tool holder is difficult, the problem is even greater when attempting to bond diamond-to-diamond and, insofar as the prior art is concerned, it appears that the joint or bond is only a mechanical one which is, of course, a weak link in cutting and grinding diamond tools whether of the larger crystal size or matrix type.

It is thus understood that improved bonding of diamond-to-diamond would provide the use of more economical diamond crystals to be formed into compacts, and the compacts in turn may be suitably affixed to holders with a greatly increased matrix strength and a marked decrease in wearing away of the compact. A conglomerate is essentially a compact of no predetermined size or shape such as a cylindrical, or pill, compact.

Accordingly, it is an object of this invention to provide an improved method of bonding diamond-to-diamond.

It is another object of this invention to provide an improved compact of diamond crystals.

It is another object of this invention to provide a diamond compact with minimal matrix.

It is another object of this invention to provide an improved diamond tool.

Briefly described, this invention, in one form, comprises mixing of diamond powder together with specific metal powders, placing the powders in a high pressure high temperature apparatus and subjecting the mixture to a pressure and temperature lying within a diamond stable region but close to the graphitization point of diamond at the given pressures so as to form cemented diamond compacts.

Figure 2:
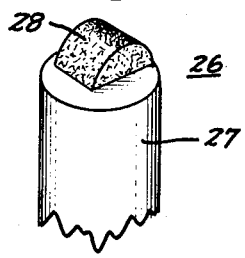

This invention will be better understood from the following description and drawing in which:

FIG. 1 is a partial and sectional view of one form of high pressure high temperature apparatus showing a reaction vessel and a specimen therein; and FIG. 2 illustrates a diamond tool including a diamond compact mounted in a support.

Referring now to FIG. 1, there is illustrated the well known form of high pressure high temperature apparatus described as a "belt apparatus." This apparatus is the subject of U.S. Patent No. 2,941,248, Hall. Briefly described, the apparatus includes a pair of punches 11 and 11' of a hard material, for example, cemented tungsten carbide and an intermediate belt or die 12 of the same material. Each punch is surrounded by a plurality of press fitted hard steel binding rings and a soft steel safety ring (not shown) which increase the strength of the punches. Die 12 also has binding and safety rings (not shown). Die member 12 includes an aperture or opening 13 in which there is positioned a reaction vessel 14. Reaction vessel 14 in one preferred form, includes a hollow electrically nonconductive cylinder 15 having concentrically positioned therein an electrically conductive tube 16. Tube 16 contains a specimen material 17 to be subjected to high pressures and high temperatures. An electrically conductive disk 18 is concentrically positioned on each end of cylinder 15 and tube 16. A pair of end caps 19 are positioned adjacent disks 18 and each includes an electrically conducting metal ring 20 encircling an electrically nonconductive disk 21. Between each punch 11 and 11' and die 12, there is included a gasket assembly 22 comprising a pair of thermally insulating and electrically nonconducting gaskets 23 and 24 and an intermediate metallic gasket 25. Suitable examples of materials from which gaskets 23 and 24 and cylinder 15 and disk 11 may be manufactured are various stones, ceramics, etc., for example, catlinite and pyrophyllite, talc, etc.

Motion of one or both punches toward each other compresses the gaskets and the reaction vessel to subject a specimen in tube 16 to high pressures while, at the same time, electrical current is provided from a source (not shown) to flow through punches 11 and 11' and through the specimen and/or the tube 16 to raise the temperature of the specimen. The foregoing description relates merely to one high pressure apparatus. Various other apparatuses are capable of providing the required pressure and temperature that may be employed within the scope of this invention.

Pressure in such a high pressure apparatus is generally determined by the use of a standard which entails known electrical resistance changes of certain metals, for example, cesium, barium, thallium and bismuth at known pressures. Temperatures are determined by thermocouple elements within the reaction volume. Reference is made in this respect to the aforementioned Hall Patent 2,941,248 and to a further Hall et al. Patent 2,947,610 relating to a process of growing diamond from a carbonaceous material. Each patent more particularly describes measurements of pressures and temperatures as well as operations as employed in the present invention.

Several advantages are inherent in the use of diamond as a starting material. Generally speaking, diamond is considered electrically nonconductive so that when graphite, which is electrically conductive, is being transformed to diamond, which is electrically nonconductive, and where resistance heating of the sample is employed, the change from graphite to diamond causes a change in the electrical resistance and affects temperature control of the entire process. In this invention, therefore, where there is no transformation or conversion of graphite to diamond, no abrupt temperature changes are present.

Control of applied pressure is also important in high pressure diamond work. Diamond has a greater density and a lower compressibility than graphite so that subjection to high pressure results in less compacting and less punch travel with smaller resulting changes at high pressures.

The use of diamond as a starting material also provides greater control over impurities which may affect the reaction. In other words, impurities in diamond are not only easily determined, but are also generally very small in amount, while impurities in graphite may not be easily determined or measured.

It has been discovered that diamond powder or diamond in small particle size may be bonded by subjection to high pressures and high temperatures, particularly when in the presence of a certain metal catalyst and by preferred methods. The bonding or cementing provides a tough coherent high strength diamond compact which may be employed as cutting or grinding elements in various tools.

Since the bonding process is carried out at such high pressures and high temperatures, care must be taken not to graphitize the diamond starting material. A simple procedure employed to avoid this occurrence merely entails first establishing pressure conditions well within the diamond stable region on the phase diagram of carbon, and thereafter raising the temperature. No particular limitations attach to pressures or temperatures except that better bonding occurs at the higher pressures and at temperatures slightly above the melting temperature of the catalyst metal at these pressures. It also appears that better bonding is achieved when about 50% or less of the specimen is metal. This percentage by volume or its equivalent in weight should be such that the final compact is firmly bonded without excess metal which would weaken the structure. Stated alternatively, better bonding between diamond crystals is produced when about 50 percent or more of the specimen material 17 to be subjected to high pressures and high temperatures is diamond.

The following are given as specific examples in accordance with preferred practice of this invention.

*Example 1*

In the reaction vessel of FIG. 1, there was placed a tantalum tube 22 of about 0.450 inch in length, 0.125 inch in diameter, and 0.010 inch in wall thickness. This tantalum tube was filled with 50% of No. 9 natural diamond powder (average particle diameter 10 microns) and 50% of an equal volume of iron powder to provide 100 (weight ratio of approximately 2.2 to 1 iron to diamond respectively) percent mixture. A pair of 0.010 inch thick tantalum end disks 18 were placed one on each end of tube 16. The sample was then placed in the high pressure apparatus of FIG. 1 and subjected to a pressure of about 85,000 atmospheres and with a temperature just sufficient to cause melting of the iron at this pressure. The temperature was about 1750° C., and these conditions maintained about 10 minutes. Upon removal from the reaction vessel, several small conglomerates of cemented diamond had formed.

*Example 2*

The reaction vessel of FIG. 1 was assembled employing a tantalum tube with 50% of each (weight ratio about 2.5 to 1 nickel to diamond respectively), by volume, of nickel powder and 325 mesh General Electric man-produced diamonds. Pressure was raised to 85,000 atmospheres and the temperature raised just sufficient to melt the nickel at this pressure. Maximum temperature was about 1750° C. These conditions were maintained about 10 minutes. Upon removal from the reaction vessel, several small conglomerates of bonded diamond crystals were obtained.

*Example 3*

The reaction vessel of FIG. 1 was assembled employing a tantalum tube containing a mixture of each 50%, by volume, of titanium metal powder and 325 mesh diamond (weight ratio of approximately 1.3 to 1 titanium to diamond respectively). The pressure was raised to 85,000 atmospheres and temperature increased sufficiently to melt the titanium. These conditions were maintained about 10 minutes. Upon removal from the press apparatus, the reaction vessel was found to contain several diamond conglomerates.

*Example 4*

Example 3 was repeated using, by volume, 25% iron powder (weight ratio of 1.1:0.7:1, iron, titanium and diamond respectively), 25% titanium powder, and 50% 325 mesh diamond. Several cemented conglomerates were obtained from this example. They were quite strong and were largely unaffected by the usual mineral acids, indicating that some diamond-to-diamond bonding had occurred.

*Example 5*

The reaction vessel of FIG. 1 was assembled employing a tantalum tube as per Example 1, except 0.440 inch in length, to accommodate iron end slugs or disks of 0.005 inch in thickness, and 0.125 inch in diameter, and the tube filled with General Electric man-produced diamonds of about 325 mesh. Pressure was raised to about 85,000 atmospheres with a maximum temperature of about 1775° C. These conditions were maintained for about 7 to 8 minutes. Upon removal from the press apparatus, the reaction vessel was found to contain several disk-shaped cemented diamond conglomerates in the center of the specimen. The diamond crystals appeared to be bonded firmly together, partly by diamond-to-diamond bonds, since individual diamond crystals were not usually discernible in the conglomerates.

*Example 6*

The assembly of Example 5 was repeated with a pressure of about 85,000 atmospheres and a maximum temperature of 1750° C. These conditions were maintained for about 17 minutes at maximum temperature. After removal from the press apparatus the reaction vessel was found to contain several disk-shaped cemented diamond conglomerates.

*Example 7*

The assembly of Example 5 was repeated and subjected to a pressure of about 85,000 atmospheres and a maximum temperature of about 1600° C. These conditions were maintained for about 15 minutes. After removal from the press apparatus, several disks of cemented diamond conglomerates were obtained.

*Example 8*

The conditions of Example 5 were repeated with a maximum pressure of about 85,000 atmospheres, a maximum temperature of about 1700° C., and conditions maintained for about 12 minutes. Upon removal from the press apparatus, several disks of cemented diamonds were obtained.

*Example 9*

In the reaction vessel of FIG. 1, tube 16 was employed with a centrally-concentrically positioned Invar disk therein of about 0.01 inch thick and with the space on each side thereof filled with General Electric man-produced diamonds of about 325 mesh. The assembly was closed with a pair of tantalum disks 16 of 0.010 inch thick, on the reaction vessel. The pressure was raised to about 75,000 atmospheres at a maximum temperature of about 1400° C. These conditions were maintained for about 18 minutes. Upon removal from the press apparatus the reaction vessel was found to contain large disks of cemented diamonds on each side of the Invar disk.

An examination of a compact obtained by this invention indicates that the compact is very tough and durable and comprises a great amount of very tiny diamond crystals randomly oriented and in many instances interlocked. Little, if any, graphitization had occurred and some of the previously molten metal now serving as a bonding medium was apparent among the intertwined and interlocked crystals.

In the preceding examples and numerous other examples carrying out the practices of this invention, results indicate that the starting particle size of the various metal powders is not critical. However, small particle sizes provide better initial compacting and better metal dispersion throughout the diamond mass. Best results are obtained when the metal particle size is generally equal to or smaller than diamond particle size. Metal particle size employed was about 325 mesh and preferably no larger mesh size than about 60.

Since a compact is described as a mass of diamond crystals, in whole or portions, which are bonded, joined or united as a compact, it differs from a matrix type diamond mass because of minimum amount of bonding material present in the compact and the diamond-to-diamond bond obtained between many adjacent crystals. Such a configuration is not found in prior diamond matrix tools where diamonds are merely embedded in or dispersed through the matrix.

High pressures and high temperatures are necessary to achieve good bonding. The combination of high pressures and high temperatures is a condition which prepares the diamond particles for the bonding process.

It has been discovered that the important criteria are the employment of a pressure of at least about 70,000 atmospheres and the provision of a temperature just above that necessary to melt the added metal. These conditions in the diamond stable region of the phase diagram of carbon or above the diamond to graphite equilibrium line thereof are easily determined with reference to a phase diagram of carbon which is prior art knowledge, one reference being, for example, "Preparation of Diamonds," by Bovenkerk, Bundy, Hall, Strong and Wentorf, Nature, vol. 184, pages 1094–1098, October 10, 1959, or "Journal of Research of National Bureau of Standards," vol. 21, page 491, 1938.

Results obtained indicate that the added metal should be at least one of the following list of metals; iron, cobalt, nickel, ruthenium, rhodium, palladium, osmium, iridium, platinum, titanium, chromium, manganese, and tantalum.

The cemented diamond conglomerates indicate high strength bonding, and it appears that diamond-to-diamond bond has been obtained as described relative to the preceding examples. Diamond-to-diamond bond may be best described as follows. During high pressure conditions there will be numerous instances where a point, edge or apex of one diamond crystal will be forced against a flat surface of an adjacent diamond crystal. Because of this type of contact of a high strength point and lesser strength surface, there will be, therebetween, extremely high individual pressures much higher than in the press apparatus or reaction vessel generally. The high temperature short of graphitization in combination with the high pressures softens the weaker flat surface so that limited plastic flow occurs, and the point forces its way into the flat surface. The result is a kind of cold welding process between diamond crystals. The process is aided by the fact that impurities such as oxides are forced out of the diamond-to-diamond interface to provide exceptionally clean diamond-to-diamond weld or bond. Added metals in this instance provide a getting action for cleansing purposes or supply a bonding film of metal surrounding the innumerable welded interfaces.

While other materials may be substituted for the tantalum tube, for example, titanium, platinum tungsten, or carbon, the material chosen should not be too reactive at the high pressure high temperature conditions with adjacent materials, nor to be molten. The tube, whether it be of tantalum, tungsten, graphite, etc., is primarily employed as a heater element to heat the specimen.

Compacts were attached to suitable tool holders and employed as grinding elements and satisfactorily removed metal from a rotating steel shaft. These elements also compared favorably to other matrix diamond compacts when used as a general metal grinding element or grinding wheel dressers.

One example of a simple form of diamond tool is illustrated in FIG. 2. In FIG. 2, tool 26 comprises a support or holder 27 having a cylindrical shaped compact 28 affixed thereto. Support 27 is deemed generic to such forms of tools as cutters, grinders or grinding wheels, saws, and saw wheels, etc. The compact is attached to some support in various positions by soldering or brazing, for example, a titanium hydride soldering process as given in U.S. Patent No. 2,570,428, Kelley, or by mechanical attaching means, or by having tool or adjacent metal flow or be forced into the surface irregularities of the compact. These compacts have a distinct leathery surface with profuse and random irregularities which facilitate joining.

While specific methods and apparatuses in accordance with this invention have been shown and described, it is not desired that the invention be limited to the particular description nor to the particular configurations illustrated, and it is intended by the appended claims to cover all modifications within the spirit and scope of this invention. The term "compact" as employed in the claims is deemed generic to masses of bonded or joined crystals. The word "crystal" includes crystal portions or parts.

What I claim as new and desire to secure by Letters Patent of the United States is:

1. A tough, coherent high strength diamond compact abrasive consisting essentially of a plurality of diamond crystals and a bonding medium therefor, said bonding medium being constituted of at least one metal from the group consisting of iron, cobalt, nickel, ruthenium, rhodium, palladium, osmium, iridium, platinum, chromium, manganese, titanium and tantalum, said diamond crystals being present in a quantity forming at least 50% by volume of the compact and being oriented so that portions of some diamond crystals project into adjacent diamond crystals providing interlocking diamond-to-diamond interfaces and said bonding medium being present in an effective amount for surrounding said interfaces with metallic bonding film.

2. A diamond compact abrasive substantially as recited in claim 1 wherein the diamond crystals are substantially of 325 mesh size or smaller.

3. A method of bonding diamond to diamond to provide a tough, coherent high strength diamond compact abrasive which comprises:
 (a) compressing a specimen of diamond crystals and a bonding medium to a pressure of at least about 70,000 atmospheres pressure,
  (1) said bonding medium being at least one metal chosen from the group consisting of iron, cobalt, nickel, ruthenium, rhodium, palladium, osmium, iridium, platinum, chromium, manganese, titanium, and tantalum,
 (b) simultaneously heating said specimen to a temperature above the melting point of the chosen bonding medium and below the graphitization temperature of diamond at the applied pressure,
 (c) stabilizing the pressure and temperature for a period of at least about 7 minutes,
 (d) ceasing the input of heat into said sample,
 (e) removing the pressure applied to said sample,
 (f) removing the specimen, and
 (g) separating from the specimen conglomerates of diamond and bonding medium, (1) each of said conglomerates containing diamond crystals in a quantity forming at least 50% by volume of the conglomerate and oriented so that portions of some diamond crystals project into adjacent diamond crystals providing interlocking diamond-to-diamond interfaces.

4. The process as described in claim 3 wherein said pressure is at least about 80,000 atmospheres.

References Cited in the file of this patent

UNITED STATES PATENTS

| | | |
|---|---|---|
| 2,367,405 | Kott | Jan. 16, 1945 |
| 2,382,666 | Rohrig et al. | Apr. 14, 1945 |
| 2,495,257 | Hunter et al. | Jan. 24, 1950 |
| 2,828,197 | Blackmer | Mar. 25, 1958 |
| 2,947,609 | Strong | Aug. 2, 1960 |
| 3,101,260 | Cheney | Aug. 20, 1963 |